Nov. 14, 1950 — D. SCIAKY — 2,529,634
SLIDING CONTACT SYSTEM FOR CONDUCTING ELECTRIC CURRENTS
Filed Aug. 2, 1949
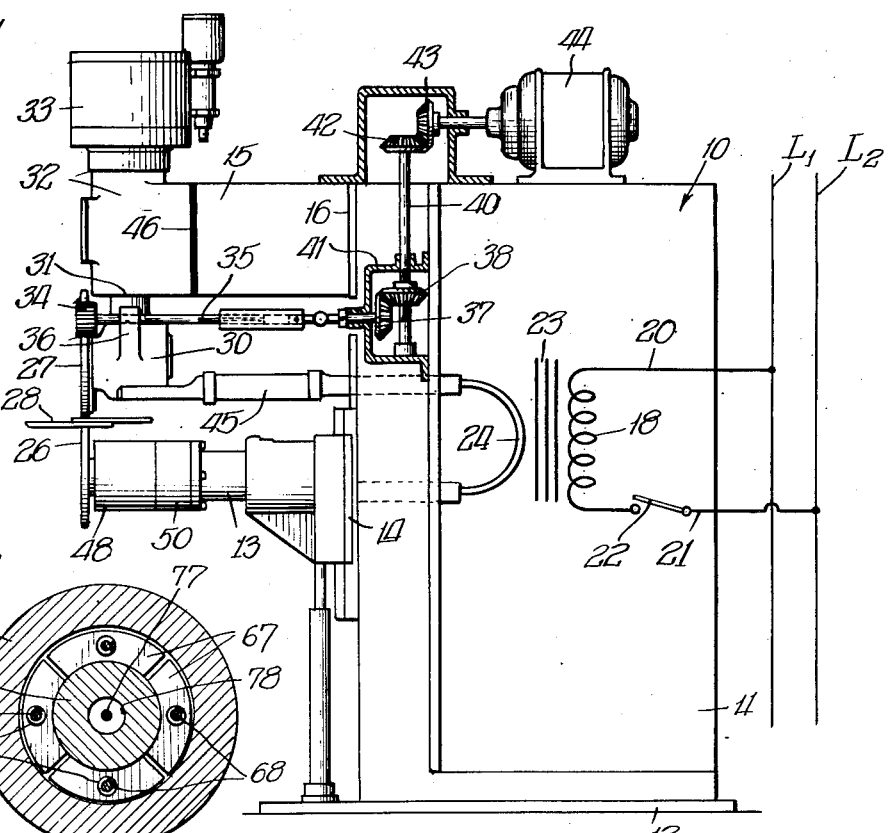
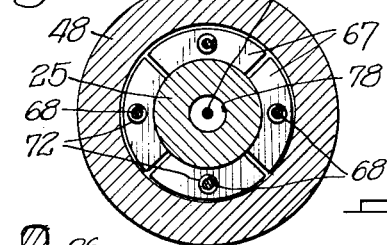
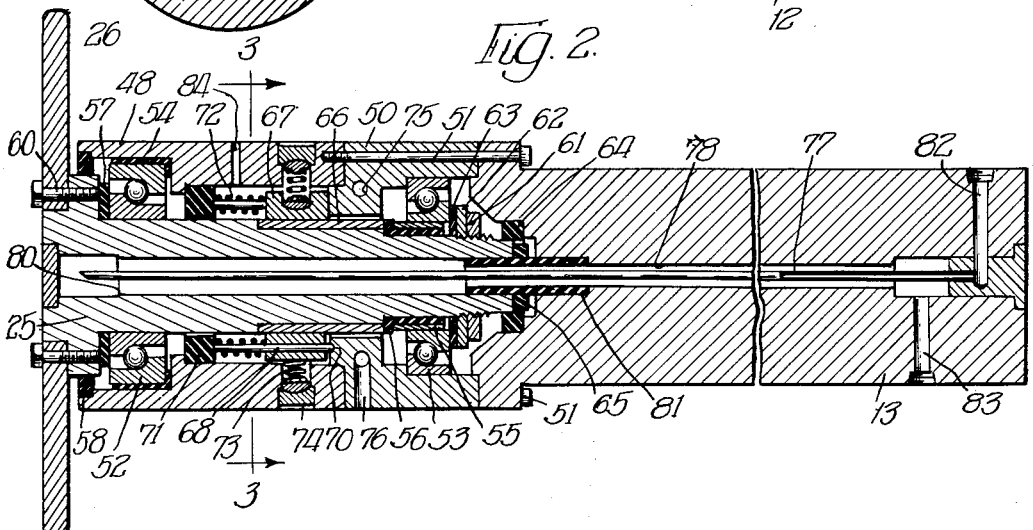
INVENTOR.
David Sciaky,
BY
Wilkinson Huxley Byron & Hume
Attys.

Patented Nov. 14, 1950

2,529,634

UNITED STATES PATENT OFFICE 2,529,634

SLIDING CONTACT SYSTEM FOR CONDUCTING ELECTRIC CURRENTS

David Sciaky, Chicago, Ill., assignor to Welding Research, Inc., Chicago, Ill., a corporation of Illinois Application August 2, 1949, Serial No. 108,164

6 Claims. (Cl. 219—4)

1

The invention relates to electrical apparatus and has reference in particular to mechanism for conducting heavy currents from a stationary member to a moving member by means of a third floating member.

In certain electrical apparatus, as, for example, resistance welding machines, a current of high amperage is induced in the secondary winding of the welding transformer and this current is conducted from at least one terminal of the winding to a movable electrode. In spot welding machines pressure is applied to the movable electrode to cause it to engage the workpiece between the same and a stationary electrode. In seam welding two wheels are used as electrodes, one being motor driven and rotating on a stationary bearing and the other being mounted on a movable bearing and at times deriving its motion from friction with the moving workpiece.

In both the aforementioned spot welding and seam welding machines the problem arises of conducting the current from one terminal of the transformer secondary to the movable electrode in such a way that the latter can freely move and no detrimental current losses can take place. A well known solution of this problem consists in the use of flexible conductors connecting one terminal of the transformer secondary to the movable electrode. Some of these conductors are made of thin copper laminations and others comprise a cable made of a multitude of thin wires. Both types of conductors have a limited life due to mechanical fatigue and vibrations caused by the electro-dynamic effect of the high amperage alternating current they conduct. The heat generated in them by this current contributes also to their disintegration.

In both the aforementioned spot welding and seam welding machines the problem arises of conducting the current from one terminal of the transformer secondary to the movable electrode in such a way that the latter can freely move and no detrimental current losses can take place. A well known solution of this problem consists in the use of flexible conductors connecting one terminal of the transformer secondary to the movable electrode. Some of these conductors are made of thin copper laminations and others comprise a cable made of a multitude of thin wires. Both types of conductors have a limited life due to mechanical fatigue and vibrations caused by the electro-dynamic effect of the high amperage alternating current they conduct. The heat generated in them by this current contributes also to their disintegration.

In the aforementioned seam welding machines the wheel shaped electrode rotates in a bearing and the current is conducted from the bearing to the wheel shaft. The same bearing also has to take the radial load applied to the shaft as the wheel is forced under pressure into contact with the workpiece. This radial pressure produces a contact between the shaft and the bearing and enables the current to pass from one part to the other. However, the contact surface between shaft and bearing is only a linear contact and this results in a high concentration of the current on an extremely narrow contact surface. The resulting heat losses accelerate the wear of the bearing and shaft already caused by the radial pressure. Eventually the contact conditions deteriorate and the guiding of the shaft in the bearing becomes inaccurate. A frequent renewal of shaft and bearing is required in order to maintain the machine in proper working condition.

In view of the foregoing, an object of the invention is to provide new and improved structure for conducting current from its source to a rotating electrode or similar current carrying conductor and which will be rugged in design and capable of continuous service without appreciable deterioration or wear.

Another object of the invention is to provide sliding contact structure for connecting the rotating electrode wheel of a resistance welding machine to one terminal of the secondary power circuit of the machine and which structure will operate efficiently and in a manner to eliminate detrimental current losses while permitting free rotation of the electrode.

Another and more specific object of the invention is to provide improved means for conducting current from one terminal of a secondary welding circuit to the rotating shaft of a seam welder and which will provide large contact areas between relatively moving parts so as to reduce the electrical resistance and facilitate transfer of the current.

Another object is to provide current conducting segments for conducting current to a rotating shaft and wherein the segments have sliding contact with the shaft and are so resiliently mounted that the floating condition of the segments permits them to follow any surface irregularity, and to also compensate for the normal play which may exist in the roller or ball bearings.

With these and various other objects in view, the invention may consist of certain novel features of construction and operation as will be more fully described and particularly pointed out in the specification, drawings and claims appended hereto.

In the drawings which illustrate an embodiment of the invention, and wherein like reference characters are used to designate like parts—

Figure 1 is an elevational view of a resistance welding machine of the seam welding type which embodies the improvements of the invention;

Figure 2 is a sectional view of the driven wheel assembly of the seam welder of Figure 1 illustrating the sliding contact system of the invention for conducting current from the stationary electrode to the shaft of the rotating wheel; and Figure 3 is a transverse sectional view taken substantially along line 3—3 of Figure 2.

Referring to the drawings and particularly Figures 1 and 2, which show a preferred embodiment of the invention, the resistance welding machine of the seam welder type is designated by numeral 10 and generally consists of a frame 11, a bottom supporting plate 12, a lower electrode arm 13 suitably fixed to the frame as at 14 and an upper arm 15 likewise fixed to the frame as at 16. Resistance welding machines are supplied with electric current from an alternating current source such as indicated by the leads $L_1$ and $L_2$ and to which is electrically connected the primary winding 18 of the machine by the conductors 20 and 21. In order that the current supply from the alternating current source to the primary winding may be interrupted by the operator a mechanical switch such as 22 is interposed in the conductor 21. The primary winding 18 constitutes one element of the welding transformer which includes an iron core 23 of high permeability and a secondary winding 24 comprising one or more turns of a copper bar of considerable thickness.

The lower arm 13 journals the shaft 25 to which is suitably secured the electrode wheel 26, the journalling means for said shaft and the manner of conducting current from the arm 13 to the shaft being clearly shown in Figure 2, and which will be described as the description proceeds. The upper electrode wheel 27 is adapted to contact a workpiece such as 28 interposed between the wheels as shown in Figure 1, the said upper electrode being suitably journalled by the member 30 secured to plunger 31 and mounted for vertical movement with said plunger by means of the head 32. The head 32 forms part of the upper stationary arm 15 and said head includes the pressure chamber 33 which mounts a piston, not shown, for reciprocating movement to effect the up and down movement of plunger 31, the member 30 and also the upper electrode wheel 27. The upper electrode wheel 27 may be suitably driven as by the knurled wheel 34 fixed to the shaft 35 and journalled by the arm 36 integral with member 30. The pinion 37 is secured to shaft 35 at its opposite end and said pinion meshes with the pinion 38 supported by the vertical shaft 40 and keyed to said shaft so as to rotate with the same. Said shaft 40 is suitably mounted for rotation in frame 41 and by means of the pinion 42 which meshes with pinion 43 driven by electric motor 44 power is supplied to the knurled wheel 34 to drive the upper electrode wheel 27. The structure allows for movement of member 30 in a vertical direction, which movement is necessarily limited since it is only required that the electrode wheels be spaced a short distance to allow the location of a workpiece between the same.

High amperage current is conducted to member 30 by the conductor 45 which is suitably secured to the member 30 and extends rearwardly of the same so as to electrically connect with one terminal of the secondary circuit 24. The other terminal of the secondary circuit is electrically connected to the lower stationary arm 13 and from said arm the circuit is completed through the two electrode wheels. The head 32 is suitably insulated from arm 15 by the insulating strip 46.

From the foregoing it would appear that the secondary load circuit of the welding transformer is complete and operative to supply current to the electrode wheels which directly contact the workpiece so as to weld the same by the high amperage current caused to flow therethrough. However, sliding contact structure is necessary for conducting the current from the stationary arm 13 to the rotating electrode wheel of the same and likewise from the member 30 to the rotating electrode wheel of the same. The sliding contact structure of the invention operates in a manner to eliminate detrimental current losses which have been a serious problem in machines of this type and in addition the present contact structure provides large contact areas between relatively moving parts, thereby reducing the electrical resistance and facilitating transfer of the current.

Referring more particularly to Figure 2, the lower electrode arm 13 constitutes an assembly of the annular bearing members 48 and 50, the members being secured to each other and to the arm 13 by the bolts 51. The annular bearing members each house a roller bearing assembly. The assembly 52 has location within member 48 and the assembly 53 has location within member 50. It is necessary to insulate the bearing assemblies from both the shaft and the annular bearing members so that they will not conduct current. Accordingly, it will be seen that assembly 52 is insulated from member 48 by means of the insulation 54. In a somewhat similar manner the bearing assembly 53 is insulated from shaft 25, the bearing assembly having contact with the metal ring 55, which, however, is insulated from the shaft by the insulation 56. At the forward end of shaft 25 are positioned the insulating rings 57 and 58, the said insulating rings insulating the forward flanged end of the shaft 25 from bearing member 48. The electrode wheel 26 is fitted to the forward flanged end of the shaft and the same is suitably secured thereto by screws 60. The rear end of shaft 25 is threaded for receiving the nut 61 which is suitably threaded thereto. The nut retains the metal washer 62 and the insulating washer 63 on this end of the shaft, the washers being confined between the bearing assembly 53 and said nut 61. Also the rear end of the shaft is adequately insulated from arm 13 by means of the ring 64 and washer 65.

The intermediate section of shaft 25 is provided with a sleeve 66 of metal, which is preferably hard and of high conductivity. The material of bearing member 50 is likewise of highly conductive metal but the member is spaced from the shaft 25 and is thus spaced from sleeve 66 so that the flow of an electric current between the parts can only take place through the segments 67 made preferably of highly conductive material of low hardness and which have pressure contact with member 50 and a sliding pressure contact with the rotating sleeve 66 on shaft 25.

The segments 67 encircle the shaft 25 and by means of resilient coil springs the segments are resiliently biased in two directions at right angles to each other, one direction being axial, that is, along the axis of the shaft 25, and functioning to maintain the segments in pressure contact with the face of member 50, and the other direction being radial so as to maintain the segments in pressure contact with the face of member 50, and the other direction being radial so as to maintain the segments in contact with the periphery of shaft 25. Each segment is provided with a plurality of pins designated by the numeral 68, which extend through the segments and rest in recesses 70 formed in the contact face of member 50. The pins are in turn supported and positioned by ring 71 of insulating material and by means of coil springs 72 the segments are resiliently forced in a direction toward the right to maintain them in pressure contact with the face of member 50. The radial coil springs 73 are held in place by means of plug 74 and one or more of these radial springs are provided for each segment 67 in order to resiliently force the segment radially inward toward the shaft 25 to maintain pressure contact of the segments with the sleeve 66.

From the foregoing it will be seen that the axial and radial pressure exerted on the lower electrode wheel 26 will be taken up by shaft 25 which is suitably guided and journalled by the ball bearing assemblies 52 and 53. The segments 67 undergo no reaction due to these pressures exerted on the wheel. The segments are at all times maintained in pressure contact with the arm 13 comprising one of the current conducting members and with the shaft 25 comprising the other current conducting member and which rotates with respect to 13. The segments are resiliently urged into pressure contact with both the arm and the shaft and as a result of the floating mounting of the segments they can follow any surface irregularity or eccentricity of the shaft and also compensate for the normal play that may exist in the ball bearing assemblies. It is expected that wear will take place between the contacting surfaces of the segments and the rotating shaft 25 but wear of these sliding surfaces does not affect the efficient performance of the system since the other contacting face of the segments is normal to the wearing surfaces, or, in other words, parallel to the radial motion which takes place as regards the segments when wear of the surfaces brings them closer to the axis of the shaft under the effect of the radial compression springs 73.

It has been found that as much as ten thousand amperes per square inch of contact surface can be passed while the wheel and shaft are rotating and currents of this amperage can be conducted without any noticeable detrimental effect on the condition of the surfaces even after several thousand revolutions of the shaft. It will be seen that the segments do not rotate since they are held against rotation by the pins 68, which, however, assist in the mounting of the segments in a floating manner. It has been found desirable to cool the member 50 by means of the tubing 75 which may be cast in the member 50, the same conducting cooling water which is admitted thereto through opening 76 and discharged through a similar outlet. The arm 13 is likewise cooled by means of tubing 77 which extends through the axial bore 78 in arm 13 and into the central bore 80 provided in the shaft 25. The bore from the arm 13 to the shaft is bridged by means of the insulating sleeve 81 and which thereby provides a liquid conducting passage for both the arm and the shaft. Cooling water is admitted to tubing 77 by means of the inlet passage 82 and this liquid flows through the tubing to the left hand end of the same, whereupon the cooling liquid is discharged within bore 80. The liquid then flows rearwardly and is eventually conducted from bore 78 by the discharge opening 83. The provisions for cooling the parts above described will insure low temperature in the current carrying conductors and in the contact surfaces provided between the relatively moving parts.

The segments 67 are disposed around the shaft 25 with sufficient space between segments to permit their free movement and to maintain pressure contact of the segments with the shaft. This will be clear from Figure 3. It is understood that the upper electrode wheel 27 will be fixed to a shaft having journalling means and a sliding contact system as described. In order to maintain favorable sliding conditions between the segments 67 and the sleeve 66 a suitable lubricant may be introduced through aperture 84.

It is to be understood that many other uses and applications of the invention will be apparent to those skilled in the art and it is not desired that this invention be limited to the details described for its scope includes all such forms or improvements as come within the spirit of the following claims construed as broadly as the prior art will permit.

What is claimed is:

1. In a resistance welding machine, in combination, a current conducting arm, a shaft journalled by the arm and providing an electrode wheel, a plurality of segments of conductive metal having surface contact with the arm and also the shaft, means applying pressure to the segments in two directions to thereby maintain pressure contact of the same with the arm and the shaft, and other means completing an electric circuit through the segments.

2. In a resistance welding machine, in combination, a current conducting arm, a shaft journalled by the arm and providing an electrode wheel, a plurality of segments of conductive metal having surface contact with the arm and also the shaft, said segments having smooth surfaces disposed at right angles to each other for contact with smooth surfaces provided by the arm and shaft respectively, means applying pressure to the segments individually to maintain the contacting surfaces in engagement, and other means completing an electric circuit through the arm, the segments and the shaft.

3. In a resistance welding machine, in combination, a current conducting arm, a shaft journalled by the arm and providing an electrode wheel, a plurality of segments of conductive metal having surface contact with the arm and also the shaft, said segments having smooth surfaces disposed at right angles to each other for contact with smooth surfaces provided by the arm and shaft respectively, coil springs applying pressure to the segments in an axial direction and other coil springs applying pressure to the segments in a radial direction whereby to maintain the contacting surfaces in engagement, and means completing an electric circuit through the arm, the segments and the shaft.

4. In a resistance welding machine, in combination, a current conducting arm, a shaft journalled by the arm and having an electrode wheel secured thereto, said arm providing a contact face intermediate the length of the shaft and disposed normal to the axis of the shaft, a plurality of segments of conductive metal having contact with said face of the arm and also surrounding and contacting the shaft, coil springs applying pressure to the segments in an axial direction to maintain the segments in pressure contact with said face of the arm, and other coil springs applying pressure to the segments in a radial direction to maintain the same in pressure contact with the shaft.

5. A resistance welding machine as defined by claim 4, additionally including ball bearing assemblies at the respective ends of the shaft for journalling the shaft, and means insulating the bearing assemblies to prevent flow of current through the same.

6. A resistance welding machine as defined by claim 4, additionally including a plurality of pins disposed in spaced relation around the shaft and supporting and positioning the segments, said pins preventing rotation of the segments with the shaft, and said pins supporting the axial coil springs which have telescoping relation with the pins.

DAVID SCIAKY.

REFERENCES CITED

The following references are of record in the file of this patent:

UNITED STATES PATENTS

| Number | Name | Date |
| --- | --- | --- |
| 1,351,446 | Smith | Aug. 31, 1920 |
| 1,778,628 | Eckman | Oct. 14, 1930 |
| 2,236,707 | Darner et al. | Apr. 1, 1941 |

FOREIGN PATENTS

| Number | Country | Date |
| --- | --- | --- |
| 855,962 | France | Mar. 4, 1940 |

Certificate of Correction

Patent No. 2,529,634 November 14, 1950

DAVID SCIAKY

It is hereby certified that error appears in the printed specification of the above numbered patent requiring correction as follows:

Column 1, line 38, beginning with the words "In both the" strike out all to and including "disintegration." in line 55; column 5, line 4, beginning with "in pressure contact" strike out all to and including "segments" in line 6;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*